(No Model.)  2 Sheets—Sheet 1.

E. R. PLAISTED.
VARIABLE SPEED TRANSMITTING DEVICE.

No. 599,193. Patented Feb. 15, 1898.

Witnesses
F. L. Ourand
J. A. Saul

Inventor
Edgell R. Plaisted
By Fred E. Tasker
Attorney.

THE NORRIS PETERS CO., PHOTO-LITHO., WASHINGTON, D. C.

(No Model.)　　　　　　　　　　　　　2 Sheets—Sheet 2.
E. R. PLAISTED.
VARIABLE SPEED TRANSMITTING DEVICE.

No. 599,193.　　　　　　　　　Patented Feb. 15, 1898.

Witnesses　　　　　　　　　　　　　　Inventor
F. L. Ourand　　　　　　　　　　　Edgell R. Plaisted,
J. A. Saul.　　　　　　　　　By Fred E. Tasker,
　　　　　　　　　　　　　　　　　　　　Attorney.

UNITED STATES PATENT OFFICE.

EDGELL R. PLAISTED, OF MONTPELIER, VERMONT.

VARIABLE-SPEED-TRANSMITTING DEVICE.

SPECIFICATION forming part of Letters Patent No. 599,193, dated February 15, 1898.

Application filed February 23, 1897. Serial No. 624,698. (No model.)

*To all whom it may concern:*

Be it known that I, EDGELL R. PLAISTED, a citizen of the United States, residing at Montpelier, in the county of Washington and State of Vermont, have invented certain new and useful Improvements in Variable-Speed-Transmitting Devices; and I do hereby declare the following to be a full, clear, and exact description of the invention, such as will enable others skilled in the art to which it appertains to make and use the same.

My invention relates to variable-speed-transmitting devices; and its object is to provide an improved construction of the same, whereby the motion of a driving-shaft rotating at a uniform speed may be transmitted to a counter-shaft and the speed of the latter be increased or decreased, as desired, without varying the speed of the driving-shaft.

The invention consists, essentially, in a counter-shaft provided with a friction cone-gear in combination with a driving-shaft, provided with a friction cone-gear of a different diameter, and said driving-shaft provided with means whereby it may be moved in a line parallel with the working surfaces of said gears, so as to vary the distance between the axial lines of said gears, and thus increase or decrease the speed of the gear on the counter-shaft, as hereinafter fully described and claimed.

Figure 1:
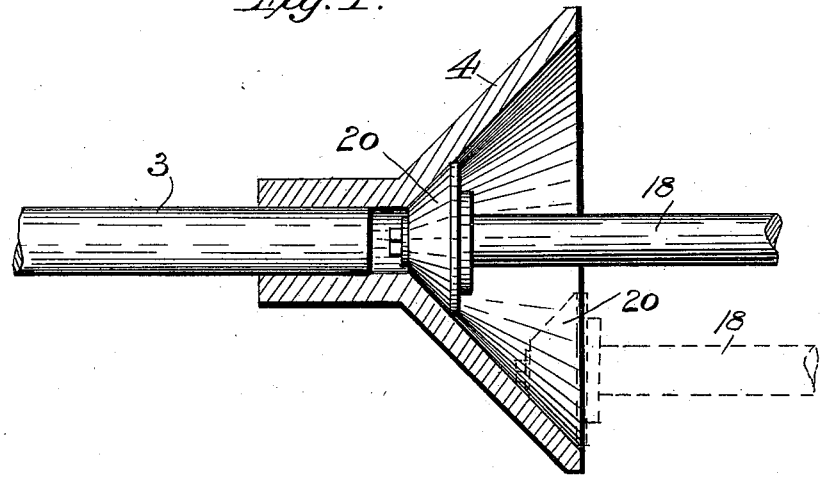
Figure 2:
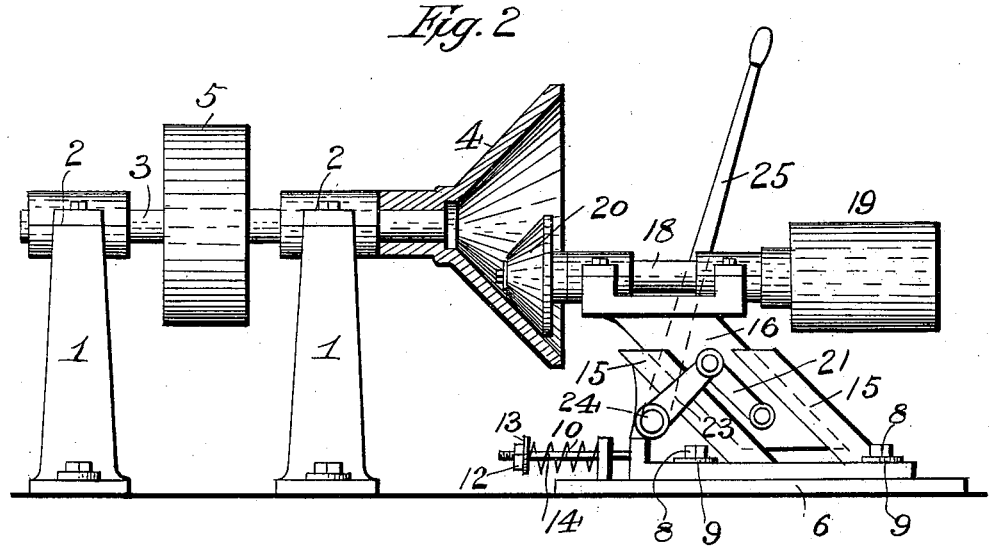
Figure 3:
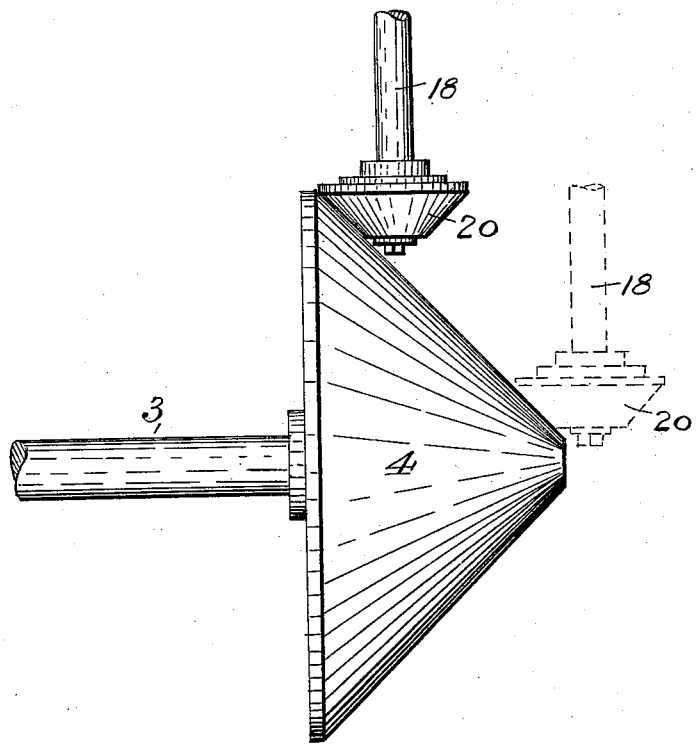

In the accompanying drawings, Figure 1 is a view, partly in section and partly in elevation, showing two frictional cone-gears constructed in accordance with my invention. Fig. 2 is an elevation, partly in section, of a variable-motion-transmitting device constructed in accordance with my invention. Fig. 3 is an elevation showing a modified construction of the cone-gears.

In the said drawings, referring now to Figs. 1 and 2, the reference-numeral 1 designates two standards, provided at their upper ends with boxes 2, in which is journaled a rotatable counter-shaft 3, provided at one end with a hollow friction cone-gear 4 and intermediate its ends with a pulley 5.

The numeral 6 designates a base, upon which is mounted a carriage 7, provided with elongated slots, through which pass headed bolts 8, provided with washers 9. This carriage is intended to have but a limited movement, only sufficient to take up the wear of the friction cone-gears, as hereinafter described, and keep their working surfaces in contact. This carriage is provided with a rod 10, passing through a lug on the base and screw-threaded at its outer end and provided with a nut 12 and a washer 13. A coiled spring 14 is interposed between said lug and washer. The said carriage is provided with two upwardly-inclined arms 15, having grooves in their inner faces or sides which form ways for an inclined movable arm 16, provided at its upper ends with boxes 17, in which is journaled a driving-shaft 18, provided with a pulley 19, by which it is rotated. At the opposite or inner end said driving-shaft is provided with a small cone-gear 20, the outer surface of which contacts with the inner surface of the hollow cone-gear, and by the friction therebetween the latter is rotated at a speed varying according to the distance between the center of said gears.

Pivotally connected with the said inclined arm 16 is a link 21, which is also pivotally connected with a crank 23, secured to a rock-shaft 24, journaled to said carriage. This rock-shaft is provided with an operating-lever 25.

The operation is as follows: The driving-shaft is rotated at a uniform rate of speed, and through the medium of the cone-gears its motion will be transmitted to the counter-shaft. In the position shown in Fig. 1 the motion of the driving and counter shafts will be equal, as the centers of the two cone-gears will be in line with each other. To accelerate the motion of the counter-shaft, the lever 25 is operated, and through the medium of the rock-shaft, crank, and link the arm carrying the journal-boxes and driving-shaft will be lowered in an inclined direction and causing the small cone-gear to move away from the center of the large or hollow gear in a line parallel with the working surfaces of said gears, so as not to throw said gears out of frictional contact. By this means it will be seen that the speed of the counter-shaft may be varied at will, the degree of variation being proportionate to the distance between the axial lines of said gears.

In the modification shown in Fig. 3 the large disk is an outside instead of an internal gear, and the shafts of said gears are at a right angle to each other instead of being in line, as in Figs. 1 and 2. Otherwise the constructions are the same.

The coiled spring 14 is simply for the purpose of compensating for the wear of the cone-gears and keep them in frictional contact under the proper degree of tension.

Having thus fully described my invention, what I claim is—

1. In a motion-transmitting device, the combination with the counter-shaft and the hollow frictional cone-gear, of the driving-shaft provided with a small frictional cone-gear, the inclined arm carrying the driving-shaft, the carriage having grooved inclined arms, and means substantially as described for operating the said arm which carries the driving-shaft, and moving the said small gear in a line parallel with its working surface.

2. In a motion-transmitting device, the combination with the counter-shaft and the hollow frictional cone-gear, of the driving-shaft, the small frictional cone-gear, the inclined arm carrying the driving-shaft, the carriage provided with grooved inclined arms, the base, the link pivoted to said arm, the crank, the rock-shaft and lever, substantially as described.

3. In a motion-transmitting device, the combination with the counter-shaft, and the hollow frictional cone-gear, of the base, the carriage having slots therein, the rod secured to the carriage, the lug through which said rod passes, the coiled spring, the rock-shaft, the lever, the crank, the inclined arms having grooves, the inclined arm working in said grooves, the driving-shaft and the small frictional cone-gear, substantially as described.

In testimony whereof I affix my signature in presence of two witnesses.

EDGELL R. PLAISTED.

Witnesses:
HENRY T. FRENIER,
I. E. CHASE.